United States Patent [19]

Nakao et al.

[11] Patent Number: 5,315,573
[45] Date of Patent: May 24, 1994

[54] NON-LINEAR OPTICAL SATURABLE ABSORBER LAYER IN AN OPTICAL DISK TO DISCRIMINATE WAVELENGTH ABOVE OR BELOW A THRESHOLD LEVEL OF INTENSITY

[75] Inventors: Takeshi Nakao, Sagamihara; Akira Arimoto, Kodaira; Kensuke Ogawa, Hachiouji; Hirofumi Sukeda; Hisataka Sugiyama, both of Kodaira, all of Japan

[73] Assignee: Hitachi, Ltd., Tokyo, Japan

[21] Appl. No.: 922,375

[22] Filed: Jul. 31, 1992

[30] Foreign Application Priority Data

Aug. 8, 1991 [JP] Japan .................................. 3-199084
Nov. 5, 1991 [JP] Japan .................................. 3-288496

[51] Int. Cl.$^5$ ............................ G11B 7/12; G11B 7/24
[52] U.S. Cl. ..................................... 369/100; 369/288; 369/283; 430/945; 430/270
[58] Field of Search ..................... 369/160, 275.2, 112, 369/109, 288, 283; 430/940, 945, 270; 359/329, 328, 241, 738; 350/96.15, 96.29

[56] References Cited

U.S. PATENT DOCUMENTS

| | | | |
|---|---|---|---|
| 4,778,237 | 10/1988 | Sorin et al. .................. | 350/96.15 |
| 4,946,629 | 8/1990 | Allen et al. .................. | 430/940 |
| 5,045,239 | 9/1991 | Miyata et al. ................ | 359/328 |
| 5,080,469 | 1/1992 | McCahon et al. ........... | 359/241 |
| 5,153,873 | 10/1992 | Spruit et al. ................. | 369/275.2 |
| 5,253,103 | 10/1993 | Boyd et al. .................. | 359/329 |

FOREIGN PATENT DOCUMENTS 198142  4/1989  Japan .............................. G11B 7/26

OTHER PUBLICATIONS

Technical Digest Series of Optical Data Storage Topical Meeting, Feb. 1991, vol. 5, Lecture No. TUB-3, pp. 112-115, No. TUB-4, pp. 116-119.
Applied Optics, vol. 29, No. 26, Sep., 1990, "Optical Storage Read-Out of Nonlinear Disks", Bouwhuis et al.
The Porphyrins, vol. III, Physical Chemistry, Part A, University of British Columbia, pp. 1-49.

Primary Examiner—Paul M. Dzierzynski
Assistant Examiner—Kim-Kwok Chu
Attorney, Agent, or Firm—Fay, Sharpe, Beall, Fagan, Minnich & McKee

[57] ABSTRACT

An information recording medium for suppressing the interferences of bits before and after reproduction and improving the optical resolution with saturable absorber 102 disposed adjacent or in an information recording medium layer 103. The recorded information is detected only from a region having a predetermined optical intensity or more of the focused spot so that minute information bits smaller than the optical resolution can be reproduced to improve the recording density of an optical disk drive drastically.

16 Claims, 8 Drawing Sheets

NON-LINEAR OPTICAL SATURABLE ABSORBER LAYER IN AN OPTICAL DISK TO DISCRIMINATE WAVELENGTH ABOVE OR BELOW A THRESHOLD LEVEL OF INTENSITY

BACKGROUND OF THE INVENTION

The present invention relates to optical disk recording and reproducing.

In Technical Digest of Optical Data Storage, 1991, Vol. 5, lecture no. TUB-3 on pages 112–115 and lecture no. TUB-4 on pages 116–119, there is disclosure of reproducing signals weaker than a reproduction limit. A multi-layer magneto-optical recording film has a layer for "masking" the surrounding information that is on an information recording layer. Since the information (bits) recorded in the information recording layer appear in the portion heated by radiation with a reproducing optical beam, interference between adjacent bits can be suppressed, even if the recording density is high, to improve optical resolution.

In general, an optical disk uses a laser beam for recording and reproducing. Laser disks have been used as the well known compact disk and as external memory for a computer system. To improve the density of recording, it has been proposed to (1) make the laser beam wavelength as short as possible, and (2) provide a mask over the optical disk to shield adjacent recording bits or recording information, thereby to suppress interference with the adjacent recording information.

SUMMARY OF THE PRESENT INVENTION

It is the object of the present invention to provide high-density optical recording and reproducing. In achieving this object, the present invention analyzes the problems associated with the prior art and provides specific embodiments for solutions of such problems.

The prior art referred to above uses a plurality of layers of information recording magneto-optical material and a mask for suppressing interference of information from adjacent recording bits. Therefore, the prior art is restricted to a magneto-optical disk. The prior art does improve optical resolution by employing a mask effect on the disk in an effort to avoid interference to or by adjacent recording bits, because the recording bits (information) appear on the portion of the information recording layer that is heated by radiation of a reproducing optical beam spot. However, there is a time delaying in recording because the information recording layer is limited to the magneto-optical material and because of a thermal suppression effect, so that recording bits are not masked after they have been passed by the reproducing optical spot. Thereby, there is a problem that interferences of recording bits are still left after the reproduction. That is, the interference of bits reproduced remain even though the interferences of the bits before the reproduction could be suppressed, because the bits having appeared on the mask layer during reproduction remain even after the reproduction optical beam spot has passed.

The above mentioned problems are solved by the present invention by suppressing the interferences of bits before and after reproduction, to improve optical resolution and to provide an information recording device of higher density. Particularly, an optical disk employs an optical material having a non-linear light absorber, or alternatively stated a non-linear light transmitter, for example a saturable light absorber.

Specifically, an optical disk employs a thin film of saturable absorber disposed on, or in, or closely adjacent the information recording medium. The information is recorded or reproduced, that is written or read by radiating the recording medium with an optical beam through the non-linear optical material. Different wavelengths are used for recording and reproducing for even better results, preferably with a reproducing wavelength being shorter than the recording wavelength. Further, it is preferable that the recording be accomplished with a laser beam having a wavelength that is not affected by the non-linear optical material, more particularly the saturable light absorber, and to employ a different laser beam for reproducing with a wavelength that is most effected by the non-linear optical material. A non-linear optical material suitable for the present invention is a saturable light absorber that has properties of absorbing an optical beam that is less than or equal to a fixed constant first threshold intensity level and which will transmit the beam of an intensity exceeding a fixed constant second threshold intensity level, which may be the same as the first. That is, the saturable absorber, which is preferably a thin film, will saturate and turn transparent if the irradiating laser of a particular wavelength exceeds a constant threshold value characteristic of the saturable absorber at the wavelength.

The saturable absorber is arranged in the vicinity of the information recording layer, and the information recording layer is radiated with an optical beam, preferably a laser beam, through the saturable layer. The laser beam will not transmit through the saturable absorber when the intensity of the beam radiation is lower than a fixed threshold level, so that the information recording layer will not be radiated for either reproducing or recording. When a threshold level is referred to, it to be understood that the threshold level is with respect to the irradiating beam; by way of example, the threshold level for a saturable absorber may vary according to wavelength of the irradiating beam. Therefore, when the radiating beam has an intensity lower than its threshold level for the saturable absorber, it cannot be used for either recording or reproducing.

If the radiating beam or a portion of the radiating beam exceeds the threshold level, it can be used for reproducing and/or recording. Thus, the non-linear optical medium is, for each wavelength, transparent above the threshold level of intensity opaque and below the threshold level of intensity. A threshold level may not be an exact fixed level of intensity, but may be a small range of intensity as understood from the general meaning of the word threshold as it is used in electronics and optics.

The radiating beam may have only its central portion of sufficient intensity to exceed the threshold level, so that the outer portions of the beam are blocked by the effectively opaque non-linear optical material, which passes only the central portion of the beam. The effective portion of the beam that reaches the information layer is then a very small spot beam having a sharp intensity drop-off at its edges, so that both interferences of the bits before and after the bit being reproduced can be eliminated, unlike the prior art. Therefore, minute signals lower than the optical resolution of the prior art can be reproduced without being overcome or adversely affected by adjacent bits. Accordingly, a higher density can be provided by the present invention. Also, a non-linear optical material may be used to provide a recording central spot of the type mentioned above for reproducing, to record smaller spots in the recording layer than would be produced if the entire optical beam, (including it's outer portions) were to pass to the recording layer. This contributes to higher density recording.

Although the non-linear saturable absorber is useful to provide a threshold level for masking out the outer portions of the irradiating beam during reproducing, such does have a problem of heat liberation in an optical information recording device using a laser beam of high output, although it has no such serious problem when using a low output laser beam. Therefore, with respect to a laser beam having a high output for recording, a further feature of the present invention is that the wavelength of the recording laser beam may be such that it is unaffected or not materially affected by the saturable absorber, for recording. That is, it is most preferable that a laser beam for recording be such that it is not affected by the non-linear optical material or that the non-linear optical material provides a threshold value substantially lower than the threshold value it provides for the different reproducing irradiating beam. More specifically, the reproducing and recording irradiating beams are of different wavelengths, and the wavelength of the recording beam is such that there is practically no threshold level for the non-linear optical material to thereby eliminate optical loss and heat liberation. Thereby, high density recording and high resolution reproducing can be provided by a reproducing laser beam of a wavelength with high absorption characteristics, that is a high threshold level for the saturable absorber, and utilizing a recording laser beam having a wavelength of low absorption characteristics, preferably with a zero threshold level for the saturable absorber.

Therefore, for recording at low intensity, the saturable absorber can be used to provide a recording spot smaller than the focused beam provided by an optical system and the recording spot is provided with a sharper intensity gradient at its edges.

For reproducing, which by it's nature is at low intensity, the saturable absorber is used to provide a reproducing spot smaller than the focused beam provided by an optical system and with a sharper intensity gradient at it's edges.

For high output recording, the wavelength of the recording beam may be so chosen that the recording beam is effectively unaffected by the non-linear optical material. Preferably, the wavelength of the reproducing laser beam is made shorter than that of the recording laser beam, which will provide for even higher density recording. In other words, the information is reproduced by using a laser beam of shorter wavelength than that used for recording so that higher-resolution reproduction can be achieved.

BRIEF DESCRIPTION OF THE DRAWINGS

Further objects, features and advantages of the present invention become more clear from the following detailed description of a preferred embodiment, shown in the drawing wherein.

DETAILED DESCRIPTION OF A PREFERRED EMBODIMENT

Throughout the drawings, like numerals will be used to refer to like elements or parts.

In the present application, transparent and opaque materials transmit an intensity of the light being used that is respectively effective and not effective for the purposes. For example, with a laser beam of I max, maximum intensity, used for reading an optical disc, an effective intensity could be $>15$, I max, while a non-effective intensity would be $<15\%$ I max.

The thin film non-linear optical medium layer may be any saturable absorber, as a specific example, it can be a thin film that is made of a metal complex compound of copper, cobalt or iron with phthalocyanine. The non-linear optical medium may exhibit absorption characteristics of one predetermined wavelength range but not in other predetermined wavelength ranges, when employed with the features of the present invention wherein different wavelengths are used for recording and reproducing, with recording to be unaffected by the non-linear optical material. An example of such material is nickel phthalocyanine, having the characteristics shown in FIG. 8. In general, a variety of organic dye compounds or compound semiconductors may be used. When only a single wavelength laser beam is used, or when it is desired to have substantially the same threshold intensity value for recording and reproducing, the non-linear optical material may be a more general purpose saturable absorber having a threshold over a wider range of wavelengths then shown in FIG. 8 or uniform throughout the usable wavelengths.

Figure 1:
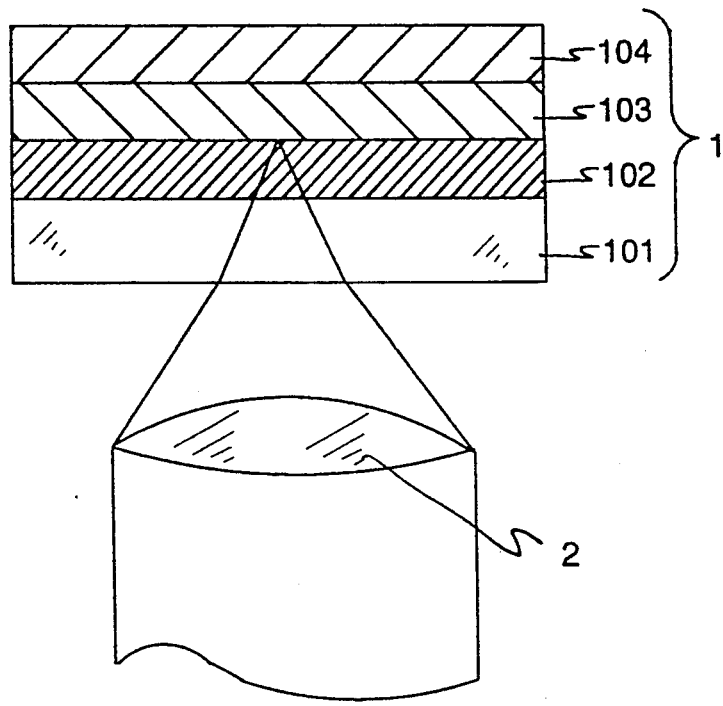
FIG. 1 is an enlarged cross-sectional portion through an optical disk showing the disk structure of the present invention together with a schematic representation of an optical beam passing into the structure, for reproducing or recording.

FIG. 1 shows one embodiment of an information recording medium according to the present invention. This information recording medium 1 is constructed by laminating a saturable absorber 102, an information recording layer 103 and a protecting layer 104 on a recording medium substrate 101, as shown.

A luminous flux emanating from a light source is focused by a focusing lens 2 from the side of the recording medium substrate 101 through the saturable absorber 102 onto the information recording layer 103.

Figure 2:
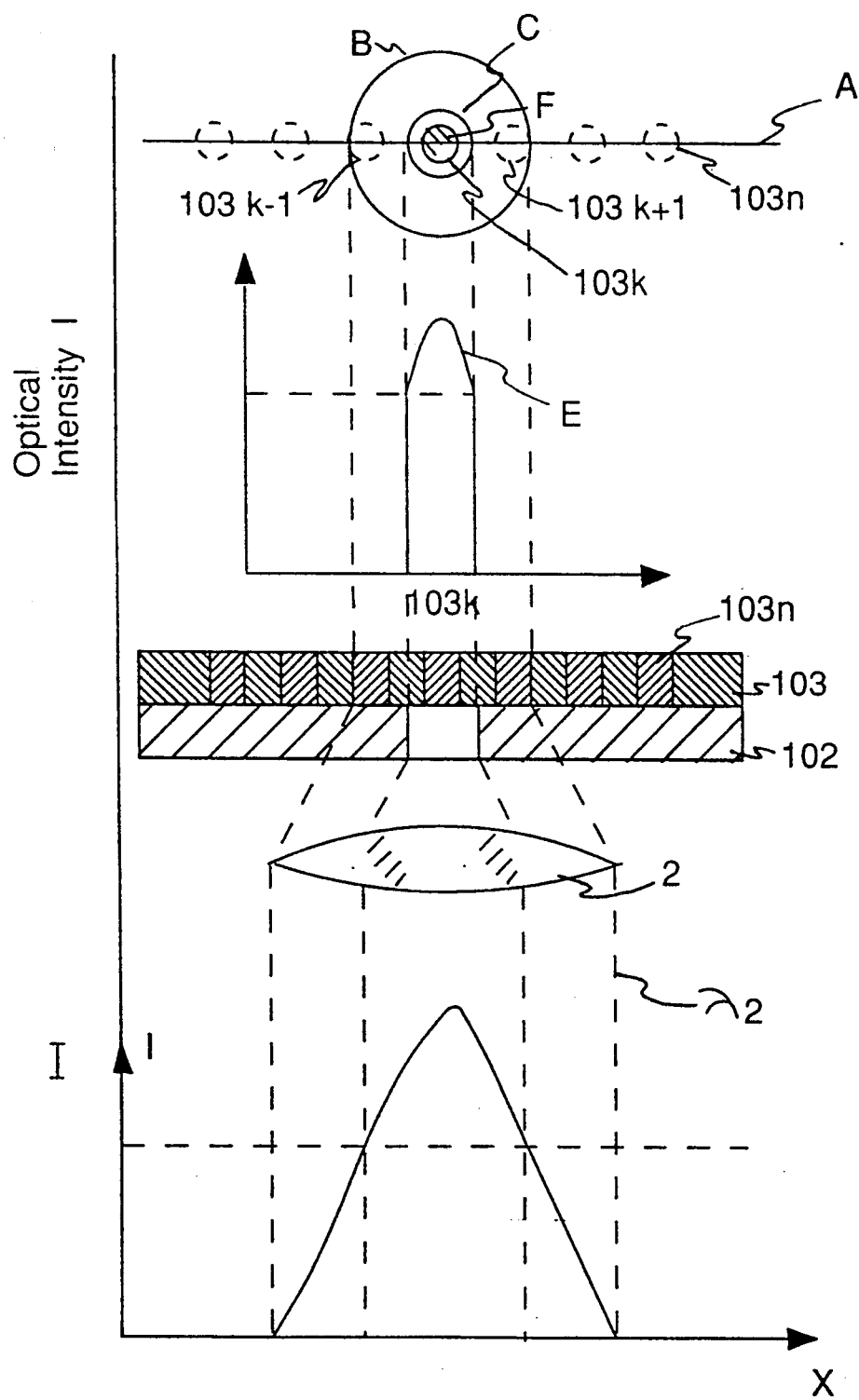
FIG. 2 is a conceptual time/position synchronized diagram showing the interrelationship of the optical beam, non-linear optical material and recording layers of the disk, optical beam intensity, and an information track in plan view with a beam superimposed thereon.

Next, an information signal reproducing method according to the present invention will be described with reference to FIG. 2. For simplicity of description, there are omitted of the information recording medium substrate 101 and the passivation and or protecting layer 104 of FIG. 1. Moreover, let it be assumed that the information recording layer 103 is recorded with information bits $103n$ along the center of an information recording track A.

The luminous flux from the light source is focused by the focusing 2 onto the information recording layer 103. At this time, the diameter D of the focused spot on the disk (i.e., the spot diameter having a spot intensity size of I max/$e^2$ where I max is the maximum of the optical intensity, with e being the base of the natural logarithm, which focused spot outer diameter is therefore about 15% of I max. Thus a material that passed less than 15% of I max would normally be considered opaque in such an environment.) is generally expressed by the following Equation:

$D=\lambda/NA$.

Here, $\lambda$ designates the wavelength of the irradiation light, and NA designates the numerical apertures of the focusing lens 2. In the reproduction method of the prior art, the information bits are not resolved if their gap is as small as about one half of the spot diameter.

When the luminous flux is focused onto the information recording layer 103, the optical intensity I at and near the information recording layer 103 takes the so-called "Gaussian recording distribution", as shown by curve E of optical intensity. In the region (B-C) of the disk as shown in FIG. 2, having an optical intensity lower than a constant level $I_0$, according to the present invention, the light is absorbed by the saturable absorber 102. In the region C having an optical intensity higher than the constant level $I_0$, on the contrary, the light transmits through the saturable absorber 102. As a result, the detectable region F is formed only at the center of the light-irradiated region B so that only the information bits $103k$ of the information recording layer 103 at that portion can be detected The constant level $I_0$ can be set to a suitable value by adjusting the thickness, material and density of the saturable absorber 102. Therefore, it is possible to form a detectable region C which is sufficiently smaller than the light-irradiated region B determined by the light source of the optics. As a result, the interferences of the before and after bits, $103k-1$ and $102k+1$, which have caused troubles at the high-density recording time in the prior art, can be eliminated to reproduce the minute bits $103k$ smaller than the optical resolution.

Since the reproducing method described in connection with the prior art makes use of a temperature rise in the information recording layer, the temperature distribution slightly shifts in the rotating direction of the disk while the disk is rotating. Since this amount of shift is influenced by the thermal characteristics of the medium, the characteristic dispersion is directly reflected on the dispersion of the detection time or the like of the reproduction signal. On the contrary, the phenomenon described in the present invention is caused depending upon the intensity of the light irradiated and is not followed by the recording/reproducing procedures due to the temperature rise of the information recording layer handled in the optical recording of the prior art, so that the detectable region can always be positioned generally at the center of the irradiated spot. This feature can be said preferable from the standpoint of medium interchangeability.

The saturable absorber layer 102 is formed into a layer, for example, by mixing a variety or organic dyes into a binder and by spin-coating the mixture on the information recording medium. The size of the detectable region C is controlled according to the material, concentration of the organic dye and the thickness of the layer. Moreover, the saturable absorber layer 102 may be a semiconductor. If a thin film layer having a super-lattice structure having a thickness of several tens angstroms is formed of a gallium-arsenide semiconductor, for example, it can act as a saturable absorber for an optical beam having a wavelength corresponding to that of visible light.

In an example, the saturable absorber layer 102 used was copper-naphthalocyanine or a metal complex of naphthalocyanine as the saturable absorber. The absorbing wavelength range was 600 nm to 800 nm. The saturable absorber was dissolved at 0.4 wt. % in a binder containing 4 wt. % of di-acetylcellulose in a diluted solution of cyclohexanone. The solution of copper naphthalocyanine thus prepared was spin-coated by rotating the recording film medium disk at 1,000 r.p.m. to form a saturable absorber layer 102 having a film thickness of 2,000 angstroms. The transmittance of the saturable absorber layer 102 thus prepared was 60% for a wavelength of 780 nm with an irradiation of optical intensity free from absorption saturation and about 95% with a saturated absorption as shown with respect to material 102B in FIG. 11 for the wavelength $\lambda_2$ as used in FIG. 8.

In case the saturable absorber 102 is sandwiched between the recording medium substrate 101 and the information recording layer 103, a flat recording medium substrate, for example, may be used, and a saturable absorber may be mixed into a UV curing resin for forming an information guide groove (or track).

Figure 3:
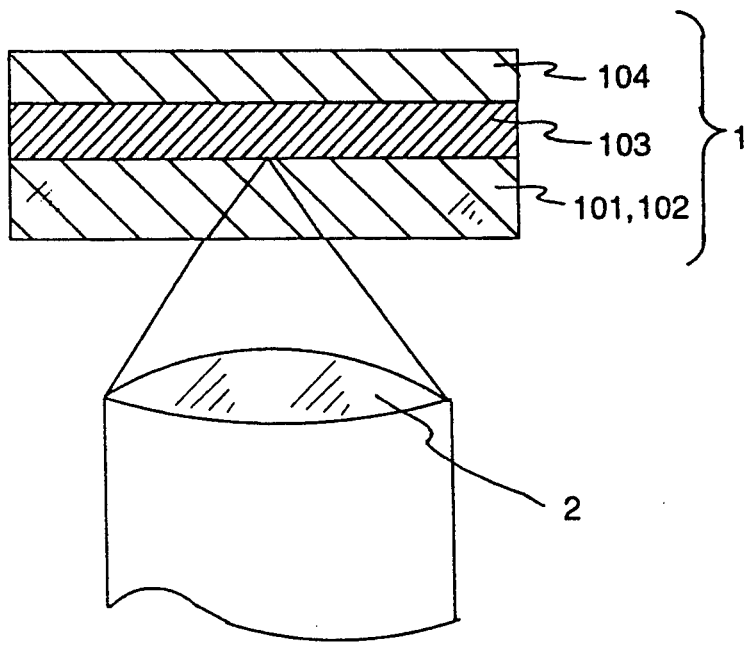
FIG. 3 is an enlarged cross-sectional view similar to FIG. 1, but showing a different arrangement of the layers in the optical disk.

FIG. 3 shows a second embodiment of the information recording medium 1 according to the present invention. In this embodiment, the saturable absorber 102 is mixed in the recording medium substrate 101. In case this recording medium substrate 101 is molded of plastics, for example, integrally with the information guide groove, a saturable absorber may be mixed in advance into the substrate. Since the saturable absorber layer need not be separately formed, the medium forming process can be simplified.

Figure 4:
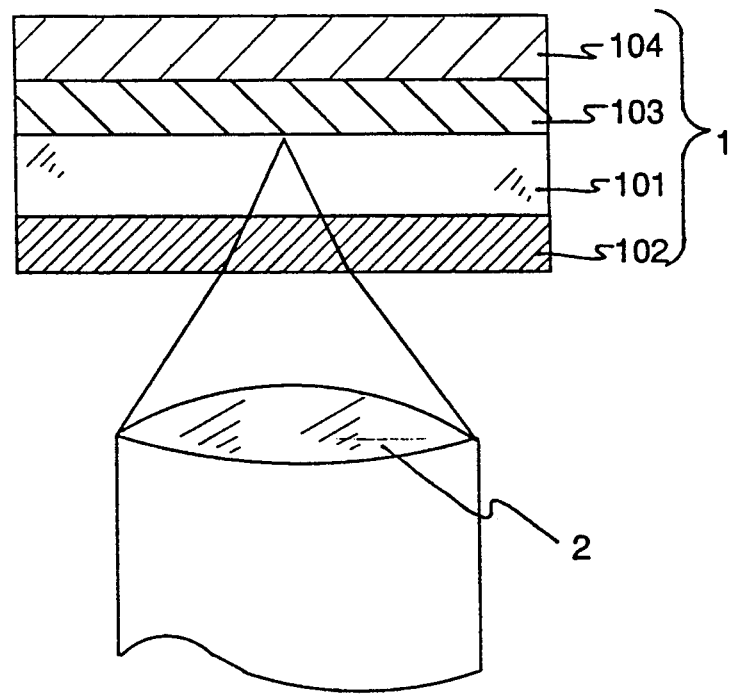
FIG. 4 is an enlarged cross-sectional view similar to FIG. 1, but showing a different arrangement of the layers in the optical disk.

FIG. 4 shows a third embodiment of the information recording medium 1 according to the present invention. In this embodiment, the saturable absorber 102 is arranged over the recording medium substrate 101 at the side of the focusing lens 2. Since the saturable absorber layer 102 and the information recording layer 103 are spaced from each other, the effect of the present invention is slightly dropped, as compared with that of the foregoing two embodiments. This embodiment is important, despite the drop, in that a considerable effect can be obtained merely by forming the saturable absorber layer 102 over the information recording medium substrate 101 of the prior art.

Figure 5:
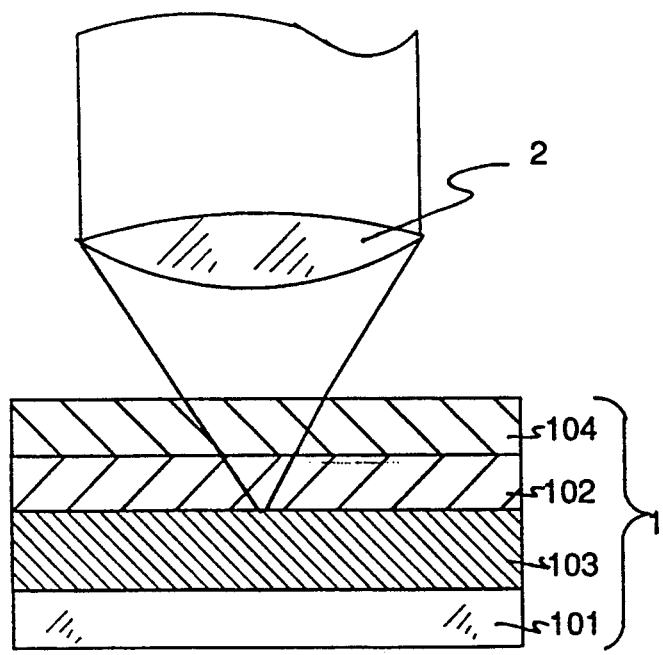
FIG. 5 is an enlarged cross-sectional view similar to FIG. 1, but showing a different arrangement of the layers in the optical disk.

FIG. 5 shows a fourth embodiment of the information recording medium 1 according to the present invention. In this embodiment, the optical beam is irradiation from the side opposite to the recording medium substrate 101. Since, in this case, the focused luminous flux will not transmit through the recording medium substrate 101, it is possible to suppress the aberration of the focused spot, that might otherwise be caused by an inclination of the substrate. Since, moreover, the substrate need not be made transparent, the structure has the advantage that the strength of the substrate can be easily improved by using a metal or the like. Incidentally, the positional relation between the protecting layer 104 and the saturable absorber 102 in the present embodiment is preferred to have the shown structure, but the two members may be arranged upside-down. Still moreover, the protecting layer 104 is not always an essential element in any of the embodiments.

Figure 6:
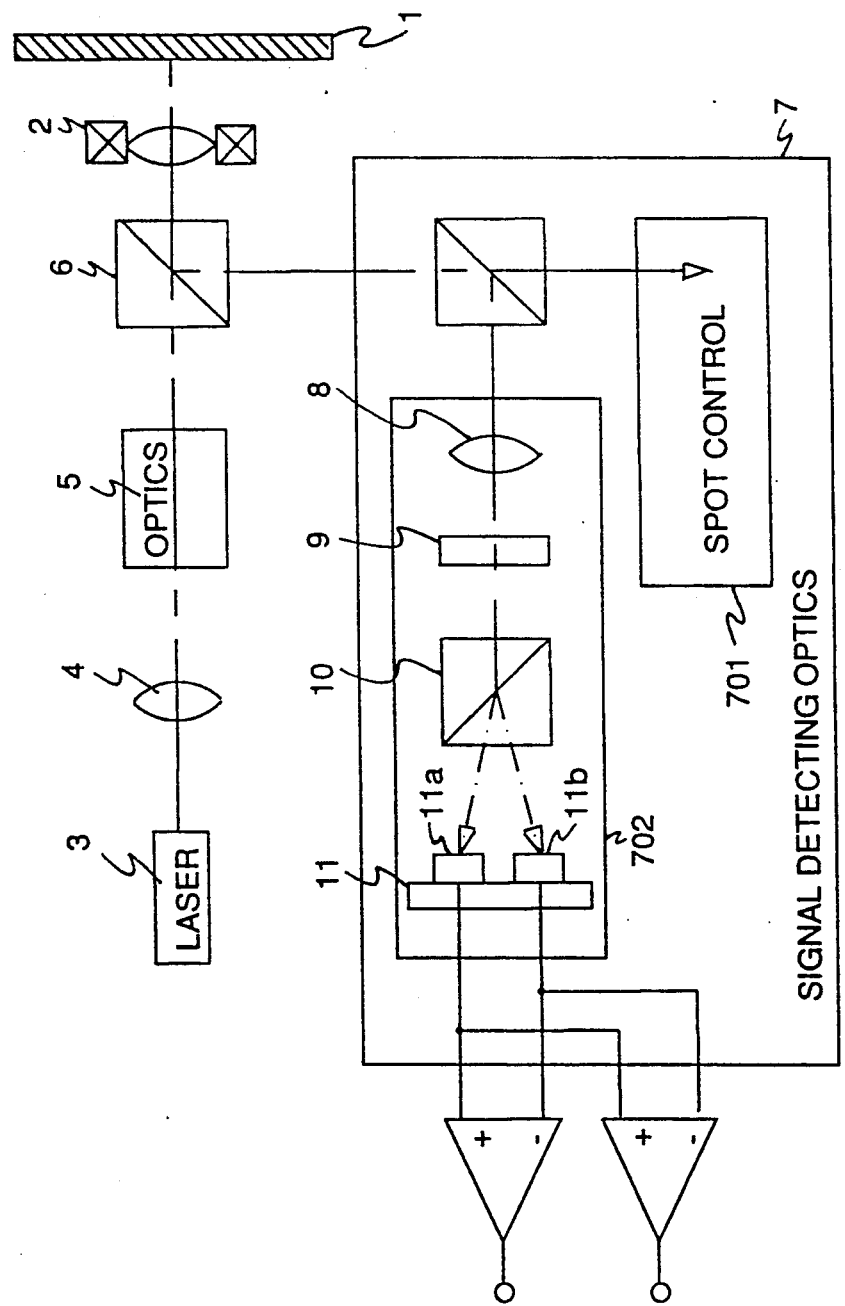
FIG. 6 is a block diagram showing the optical disk of the present invention, according to any one of FIGS. 1, 3, 4, 5, according to the principals of FIG. 2, in an otherwise conventional reproducing apparatus.

FIG. 6 shows a structure of an information recording device using the information recording medium 1 thus far described. The optical beam emitted from a laser light source 3 having a wavelength λ is shaped into a parallel luminous flux by a collimating lens 4 and is focused onto the information recording medium 1 through a beam shape conversion optics 5, a polarization beam splitter 6 and the focusing lens 2. The beam shape conversion optics 5 may be omitted from the drawing. The reflected beam from the information recording medium 1 transmits through the focusing lens 2 and is reflected by the polarization beam splitter 6 into a signal detecting optics 7. This signal detecting optics 7 is composed of: an optical spot control signal detecting optics (spot control) 701 for detecting an optical spot control signal such as a focusing error signal or a tracking error signal; and an information signal detecting optics 702 for detecting an address or recording information signal.

The optical spot control signal detecting optics 701 can operate by a focal discrepancy detecting method including the astigmatic lens method or the knife-edge method of the prior art for a track discrepancy detecting method including the push-pull method. On the other hand, the signal detecting optics 702 can be a magneto-optical signal detecting optics. The luminous flux incident upon the information signal detecting optics 702 transmits through a lens 8 and has its polarization direction turned about 45 degrees by a λ/2 wavelength plate 9. After this, the luminous flux is polarized and divided by splitter 10 into two luminous beams, which enter an optical detector 11. This optical detector 11 has two light receiving faces 11a and 11b so that the magneto-optical signal is achieved by taking a difference between the optical signals received by the two faces 11a, 11b whereas the address information or the like is achieved by adding the two signals.

In the description thus far made, the optical spot control signal detecting optics 701 and the information signal detecting optics 702 are shown as different ones, but they could be united. In the present embodiments, moreover, the description has been directed to the case of the magneto-optical type optical disk drive, but the present invention could be applied to an optical disk drive of another type such as a phase change type optical disk drive if the drive irradiates the optical beam and detects the reflected or transmitted light.

According to the present invention, the recorded information is detected only from a region having a predetermined optical intensity or more of the focused spot so that minute information bits smaller than the optical resolution can be reproduced to improve the recording density of an optical disk drive drastically.

Figure 8:
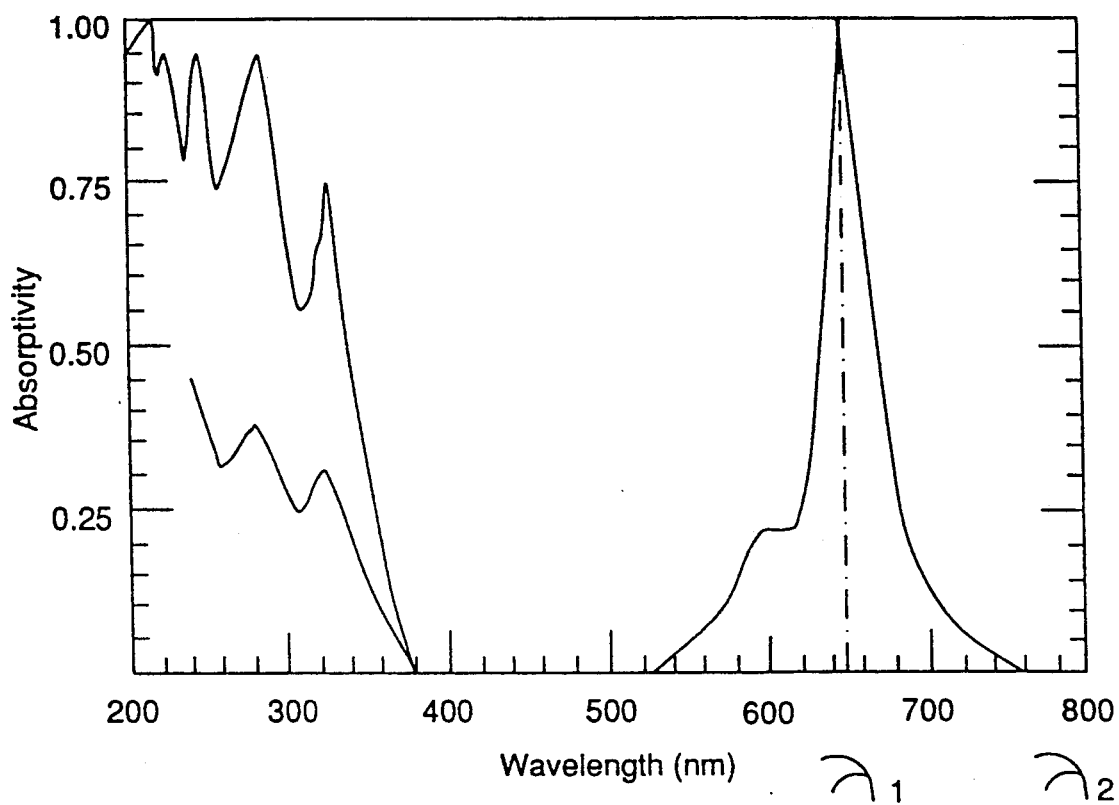
FIG. 8 is a graph showing a plot of absorptivity of a saturable absorber verses the wavelength of an irradiating beam, more particularly the wavelength dependency of nickel phthalocyamine.
Figure 10:
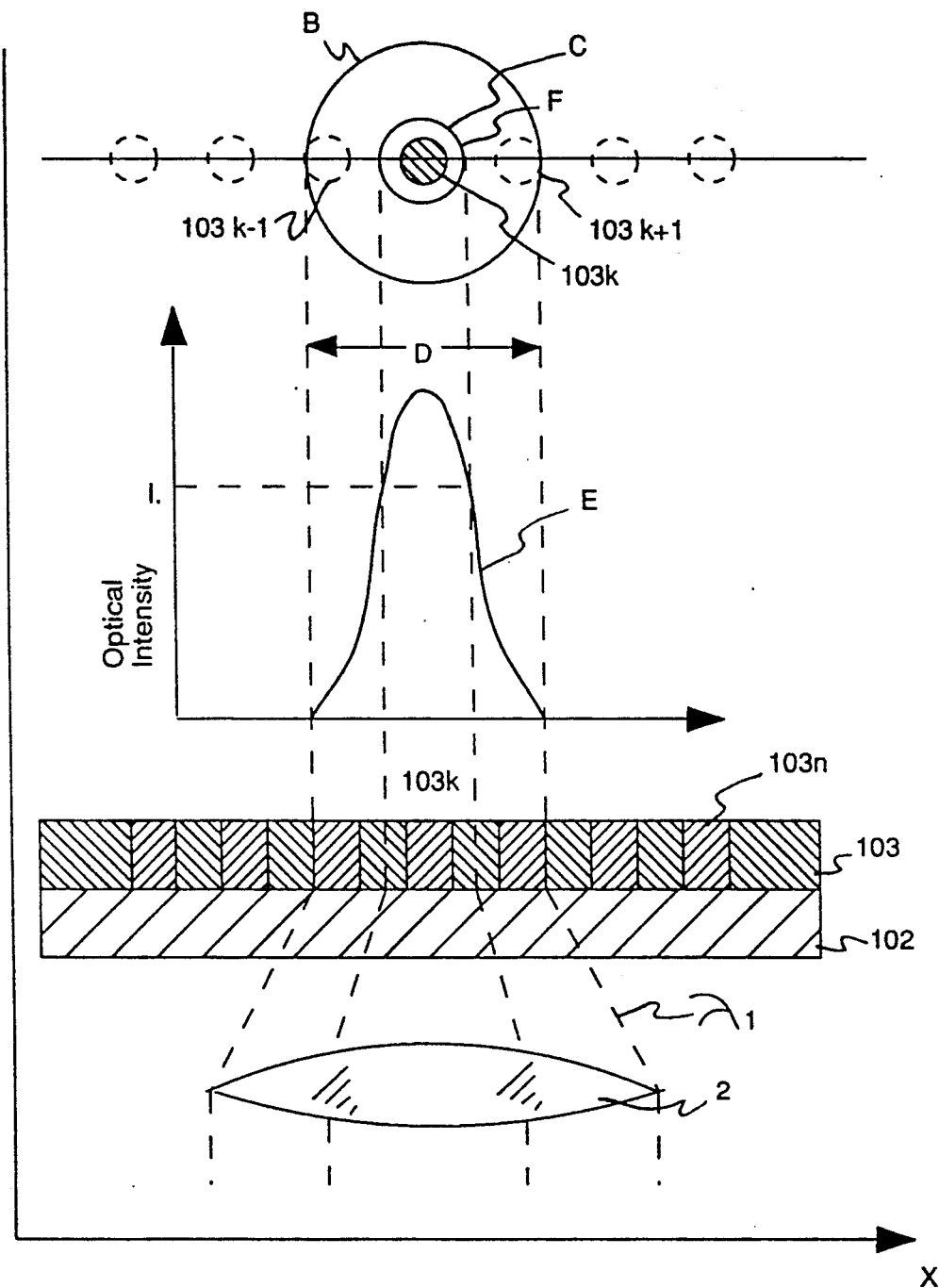
FIG. 10 is a conceptual time/position synchronized diagram showing the interrelationship of the optical beam, non-linear optical material and recording layers of the disk, optical beam intensity, and an information track in plan view with a beam superimposed thereon.

It has been found that our optical information recording medium using the saturable absorber layer, can accomplish the highly dense recording and the high-resolution reproduction. If this recording medium is used for the recording, the saturable absorber layer would undesirably liberate the heat, if disposed at the side of the optical information recording layer to be irradiated with the laser beam, because a laser beam of high output is required for the recording. Nickel phthalocyanine [referred to in The Porphyrin Vol. 3, written by D. Dolphin and published by Academic Press, NY (1978)] as shown in FIG. 8, is a saturable absorber that has wavelength ranges exhibiting the absorbing characteristics and ranges not exhibiting the absorbing characteristics. In the present invention, the laser beam is not absorbed at the recording time by the saturable absorber layer by using a laser beam of a wavelength $\lambda_1$ (e.g., 800 nm) not having the saturable characteristics for the recording and a laser beam of a wavelength $\lambda_2$ (e.g., 650 nm) having the saturable characteristics for the reproduction, so that the laser beam reaching the information recording layer is not lost while liberating little heat. Thus, it is needless to set the output of the recording laser beam to a level higher than necessary. At the reproduction time, on the other hand, the optical spot diameter on the recording face of the information recording layer can be highly focused by the effect of the saturable absorber layer thereby to accomplish the high-resolution reproduction.

For the recording and reproduction, moreover, there are provided two laser beams having different wavelength ranges. As a result, the written information can be reproduced immediately after the recording so that it can be checked. Thus, it i possible to provide an optical information recording device having the so-called "read-after-write function".

In the optical information recording/reproducing method of the present invention, it is necessary and essential for the highly dense recording and the high-resolution reproduction that the recorded information is reproduced in high resolution by irradiating a minute laser beam spot for the reproduction. A super-high resolution reproduction can be realized by selecting a laser beam of a shorter wavelength of the two laser beams for the reproduction than that for the recording and by combining it with the thin film of a matching saturable absorber.

The operations of the present invention will be described by exemplifying the case of nickel phthalocyanine shown in FIG. 8.

At the information recording time, a recording laser beam having a wavelength range not exhibiting the saturable absorption characteristics, as shown in FIG. 8, such as a wavelength ($\lambda_1$) of 800 nm is used. At the time of reproducing the recorded information, a reproduction laser beam having a wavelength exhibiting the saturable absorption characteristics such as ($\lambda_2$) of 650 nm is used. With these settings, the recording can be accomplished through the saturable absorber thin film without being influenced by the saturable absorption characteristics of the laser beam so that the laser beam is little lost to raise no problem of heat liberation. At the reproduction time, on the other hand, the reproducing optical spot on the information recording face can be focused by the effect of the saturable absorber thin film so that the interference with the adjacent recording bits (or recording information) can be suppressed by the optical masking action of the saturable absorber thin film thereby to accomplish a high-resolution reproduction.

At the reproduction time, moreover, a reproducing laser beam having a shorter wavelength than that of the recording laser beam can be used to achieve a higher-resolution reproduction.

Figure 11:
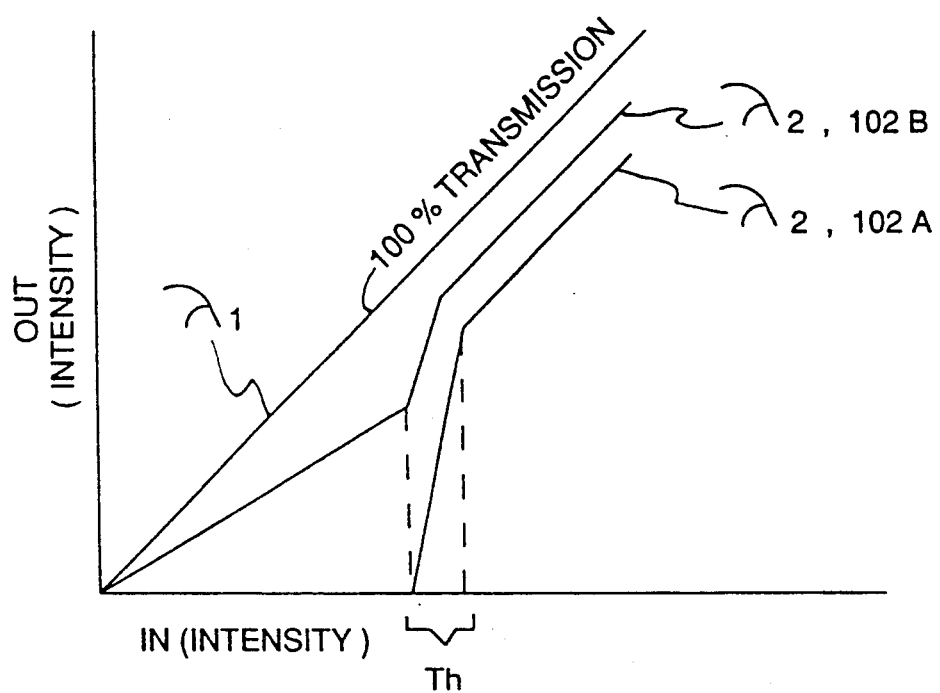
FIG. 11 is an input/output graph showing the transmission (reflection) characteristic of the present invention.

When the light source is focused onto a layer with the saturable absorption characteristics, the input/output graph using wavelength $\lambda_1$ and $\lambda_2$ is shown in FIG. 11. Generally, a saturable absorber has the dependence on wavelength, as shown in FIG. 8. In the case of using a wavelength $\lambda_1$ light irradiation, the saturable absorber doesn't have absorption. Therefore, the input/output characteristics are linear showing 100% transmission. In the case of using a wavelength $\lambda_2$ light irradiation, the saturable absorber doesn't have absorption, and saturable absorption occurs. Therefore the input/output characteristic is non-linear (FIG. 11. $\lambda_1$ (102A), $\lambda_2$ (102B)). Two non-linear characteristics are shown in FIG. 11 in compliance with a difference of concentration or kind of saturable absorption medium. For example, the saturable absorbers 102A and 102B have different non-linear characteristics than each other with respect to using wavelength $\lambda_2$.

Figure 7:
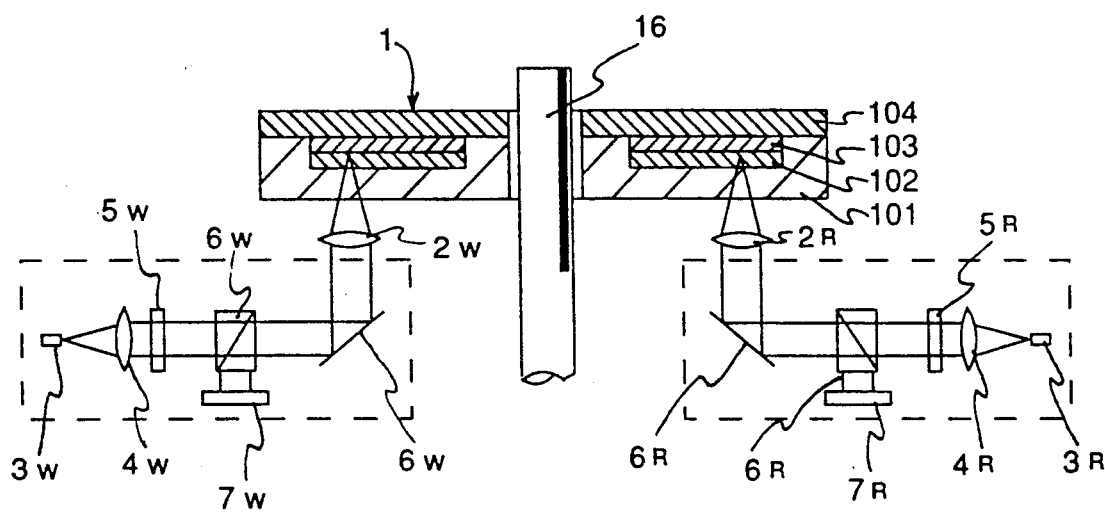
FIG. 7 is a block diagram of an optical system wherein the apparatus of FIG. 6 is employed for reading and additionally employed for writing with respect to the same disk.

FIG. 7 shows one embodiment of the structure for executing a method of recording/reproducing optical information according to the present invention. As shown, the recording optical head is constructed such that a laser beam emitted from a recording laser beam source 3w having a wavelength $\lambda_1$ is collimated into a parallel luminous flux by a collimating lens 4w. This luminous flux is passed, if necessary, through a (not shown) beam shape conversion optics. Then, the recording laser beam is passed through a polarization beam splitter 5w, a prism 7w and a focusing lens 8w until it is focused onto a recording layer 14. And, the reflected beam from the recording layer 14 is passed through the focusing lens 8w and is reflected by the prism 7w and the polarization beam splitter 5w until it is introduced into a signal detecting optics 6w. This signal detecting 6w is composed of an optical spot control signal detecting optics for detecting an optical spot control signal such as a focusing error signal or a tracking error signal, and an information signal detecting optics for detecting an address information or recording information signal. Incidentally, the method of detecting the focusing error in the aforementioned optical spot control signal detecting device can be exemplified by the astigmatic lens method or knife-edge method known in the prior art, and the tracking error detecting method can be exemplified by a variety of methods such as the push-pull method.

Moreover, the luminous flux incident upon the information signal detecting optics is polarized and divided by a polarization prism 10 such as the Wallaston prism into two luminous fluxes, which are received by two receiving faces 11a, 11b formed on an optical detector 7 so that the focusing error signal and the tracking error are produced. Thus, the information signal is obtained from the summed signal or those error signals.

On the other hand, a reproducing optical head d2 is constructed such that a laser beam emitted from a reproducing laser beam source 3r having a wavelength $\lambda_2$ is collimated into a parallel luminous flux by a collimating lens 4r. This luminous flux is passed, if necessary, through a beam shape conversion optics. Then, the luminous flux is passed through a polarization beam splitter 5r, a prison 7r and a focusing lens 8r until the reproducing laser beam is focused onto the recording layer 14.

Moreover, the reflected beams from the recording layer 14 are processed by an information signal detecting optical system like that of the aforementioned recording optical head 1 so that the individual signals are produced.

In FIG. 8a a saturable absorber layer 13 of the present embodiment was prepared to have a film thickness of 2,000 angstroms on a disk by spin-applying a solution of nickel phthalocyanine. This optical disk was mounted on the disk drive having the aforementioned recording optical head and was recorded and reproduced by using a recording laser beam having a wavelength ($\lambda_1$) of 800 nm exhibiting none of the saturable absorption characteristics of the saturable absorber layer 13 and a reproducing laser beam having a wavelength ($\lambda_2$) $\lambda_1 \geq \lambda_2$) of 650 nm exhibiting the saturable absorption characteristics. As a result, it was possible to realize a highly dense recording and a high-resolution reproduction two or three times as high as those of the otherwise identical recording/reproducing disk produced by the method of the prior art using the same optics. The higher-resolution reproduction could be obtained by making the wavelength $\lambda_2$ of the reproducing laser beam shorter than that of the wavelength $\lambda_1$ of the recording laser beam. For example, the present invention can record/reproduce with one-half the effective spot size, which means twice as many spots per linear unit of measure and twice as many tracks may be used as compared to the prior art, which means four times the density of the prior art.

Figure 9:
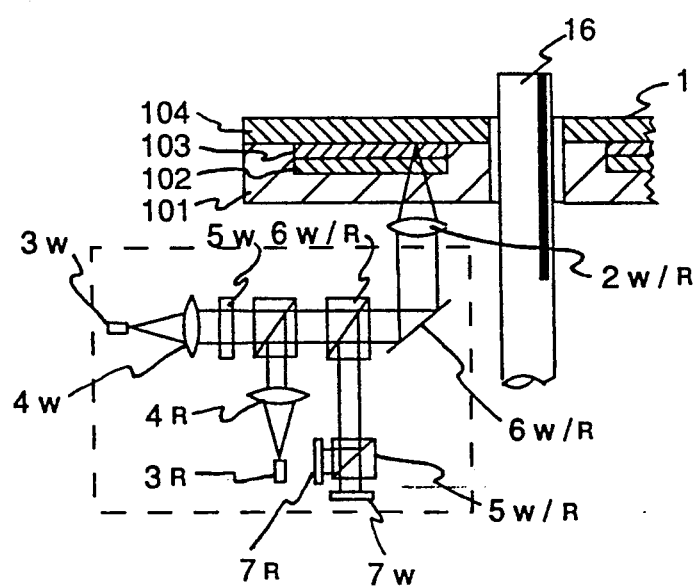
FIG. 9 is a schematic diagram showing a variation of the apparatus of FIG. 7.

FIG. 9 shows one embodiment of the structure of the recording/reproducing head of the case, in which a recording laser beam source and a reproducing laser beam source are mounted on one head. This head is constructed such that a laser beam emitted from the recording laser beam source 3w having a wavelength $\lambda_1$ is collimated into a parallel luminous flux by the collimating lens 4w. The luminous flux is passed, if necessary, through a (not shown) beam shape conversion optics. The luminous flux is then passed through beam splitters 10 and 11, a prism 7 and a focusing lens 8 so that the recording laser beam is focused onto the recording layer 14. On the other hand, the laser beam emitted from the reproducing laser beam source 3r having the wavelength $\lambda_2$ is collimated into a parallel luminous flux by the collimating lens 4r. This luminous flux is passed, if necessary, through a (not shown) beam shape conversion optics. Then, the luminous flux is passed through the beam splitters 10 and 11, the prism 7 and the focusing lens 8 so that the reproducing laser beam is focused onto the recording layer 14. Moreover, the reflected beam from the recording layer 14 is reflected by the beam splitter 11 and further by a polarization beam splitter 5 and guided into a signal detecting optics similar to that of the foregoing embodiment 1. The beams are then received by the two receiving faces of optical detectors 6w and 6r, for example, to provide the optical spot control signals such as the focusing error signal or the tracking error signal. The information signal is determined as their summation.

The recording/reproducing head thus constructed was used, and the optical information recording medium similar to that of the embodiment was mounted on the disk drive for the recording and reproducing operations. The resultant effects were similar to those of the embodiment 1, and the high-precision recording and high-resolution reproduction could be realized. Here, the advantages of the present embodiment is that the recording/reproducing head can have a compact structure and can be manufactured at reasonable cost.

In the recording and reproduction of the optical information recording medium having a thin film layer made of a saturable absorber, according to the present invention, the recording laser beam used for the recording has a wavelength having none of the saturable absorption characteristics, so that recording laser power need not be increased because of remarkably little loss and heat liberation of the recording laser beam. The reproducing laser beam used for the reproduction has a wavelength having the saturable absorption characteristics so that a high-resolution reproduction can be realized by the optical masking action of the thin film layer of the saturable absorber. Moreover, a higher-resolution reproduction can be achieved by making the wavelength of the reproducing laser beam shorter than that of the recording laser beam.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. An optical information device, comprising:
   an information recording layer having a stored information correlated pattern for one of transmitting or reflecting an incident beam of light in a corresponding information related beam of light;
   a non-linear optical saturable absorber that is effectively transparent to light of a first wavelength, that is effectively transparent to light of a second wavelength above a threshold level of intensity, and that is opaque to light of the second wavelength below the threshold level of intensity;
   recording laser means for producing a first beam of recording light at the first wavelength;
   optical means for shaping the first beam of light and directing it along a path intersecting the saturable absorber and the information recording layer;
   separate laser means for producing a second beam of reproducing light of the second wavelength;
   second optical means for shaping the second beam of light and directing it along a path intersecting the saturable absorber and the information recording layer; and
   optical means for receiving light reflected by or transmitted through the information recording layer from the second beam for reading information.

2. The device of claim 1, wherein said saturable absorber is nickel phtalocyanine.

3. The device of claim 1, wherein said saturable absorber has an absorptivity of about 1.00 at the second wavelength and an absorptivity of about 0 at the first wavelength.

4. The device of claim 1, wherein said second wavelength for reproducing is substantially shorter than said first wavelength for recording.

5. The device of claim 1, further including means for mounting the saturable absorber and information recording layer on an optical disk for rotation about an axis; an optical recording head and an optical reproducing head mounted for radial movement adjacent to said disk with respect to said axis, and said heads respectively carrying said recording laser and said reproducing laser.

6. The device of claim 1, wherein said first wavelength is about 800 nm and wherein said second wavelength is about 650 nm.

7. The device of claim 1, wherein said saturable absorber is copper naphtalocyanine.

8. The device of claim 1, wherein said saturable absorber is a metal complex of naphtalocyanine.

9. The device of claim 1, wherein said saturable absorber has an absorbing wavelength of 600 mm to 800 mm.

10. An optical information device, comprising:
    an information recording layer having a stored information correlated pattern for one of transmitting or reflecting an incident beam of light in a corresponding information related beam of light;
    a non-linear optical saturable absorber that is effectively transparent to light of a wavelength above a threshold level of intensity, and that is opaque to light of the wavelength below the threshold level of intensity;
    laser means for producing a first beam of light at the wavelength;
    optical means for shaping the first beam of light and directing it along a path intersecting the saturable absorber and the information recording layer; and
    optical means for receiving light reflected by or transmitted through the information recording layer for reading information.

11. The device of claim 10, further including means for mounting the saturable absorber and information recording layer on an optical disk for rotation about an axis; an optical reproducing head mounted for radial movement adjacent to said disk with respect to said axis, and said heads carrying said reproducing laser.

12. The device of claim 11, wherein said non-linear optical saturable absorber has an absorbing wavelength of 600 nm to 800 nm.

13. The device of claim 11, wherein said non-linear optical material is copper naphtalocyanine.

14. The device of claim 13, wherein said non-linear optical saturable absorber has an absorbing wavelength of 600 mm to 800 mm.

15. The device of claim 11, wherein said non-linear optical material is a metal complex of naphtalocyanine.

16. The device of claim 15, wherein said non-linear optical saturable absorber has an absorbing wavelength of 600 nm to 800 nm.

* * * * *